C. F. SCHAUPP.
EARTHWORKING MACHINE.
APPLICATION FILED JUNE 25, 1910.
974,526.
Patented Nov. 1, 1910.
2 SHEETS—SHEET 1.
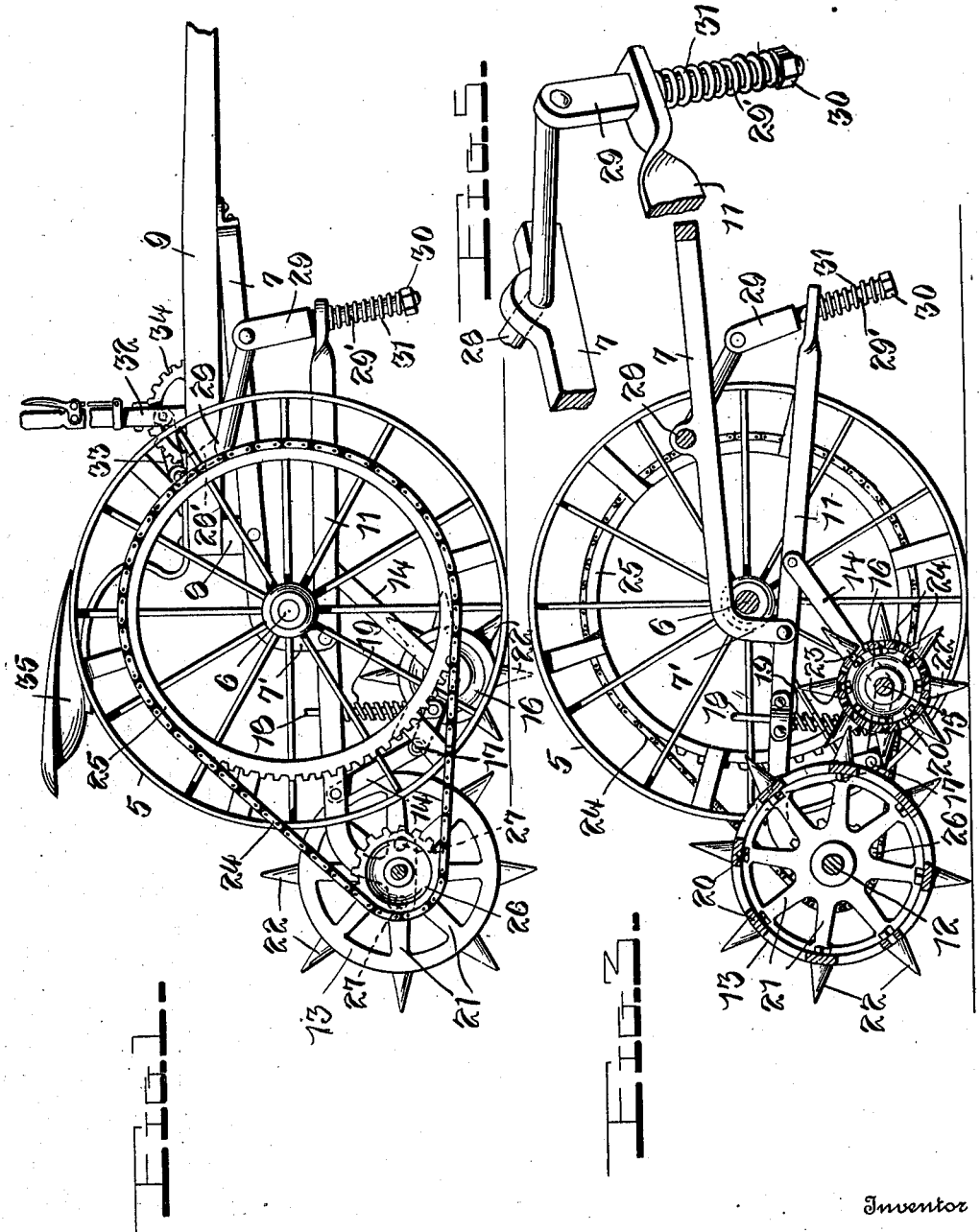
Witnesses
A. F. Garvey
E. M. Ricketts
Inventor
C. F. Schaupp,
By Watson E. Coleman.
Attorney

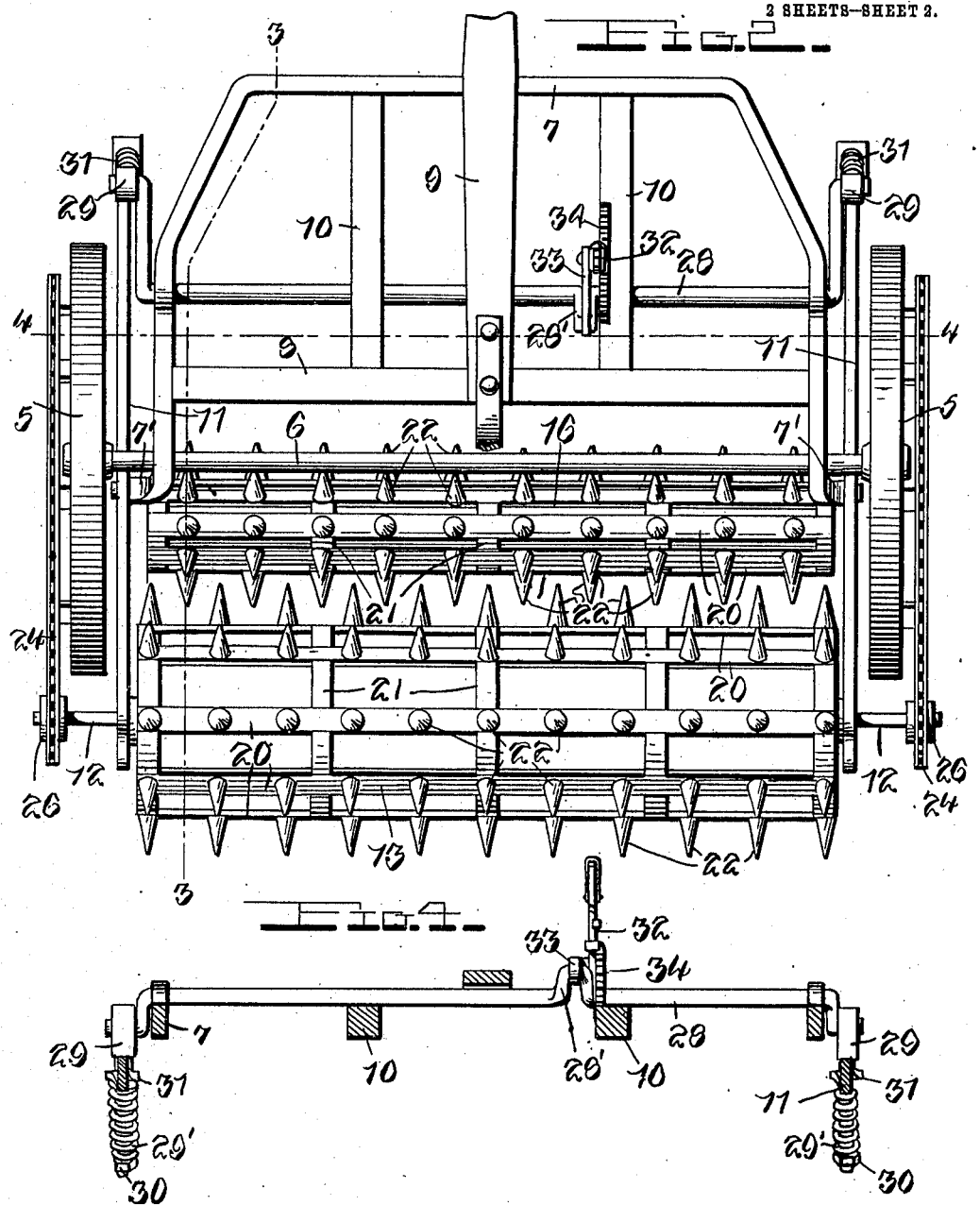

UNITED STATES PATENT OFFICE.

CHARLES F. SCHAUPP, OF WILSON, MINNESOTA.

EARTHWORKING-MACHINE.

974,526.

Specification of Letters Patent.

Patented Nov. 1, 1910.

Application filed June 25, 1910. Serial No. 568,862.

*To all whom it may concern:*

Be it known that I, CHARLES F. SCHAUPP, a citizen of the United States, residing at Wilson, R. F. D. No. 1, in the county of Winona and State of Minnesota, have invented certain new and useful Improvements in Earthworking-Machines, of which the following is a specification, reference being had to the accompanying drawings.

This invention relates to an improved earth working machine and has for its object to provide a machine of this character of comparatively simple construction and increased efficiency in operation whereby the soil may be thoroughly agitated or broken up and weeds or other rancorous growths destroyed.

A further object resides in the provision of a pivotally mounted frame having a toothed roller arranged to rotate therein and driven from the wheels of the machine and means for adjusting the frame to move the roller into and out of operative position.

A still further object of my invention is to provide a frame having two toothed rollers mounted therein the teeth of one roller moving between those of the other roller, one of said rollers being positively driven, a second wheel supported frame arranged on the tongue of the machine and having a crank shaft mounted to oscillate therein and connections between said wheel supported frame and the first named frame for rocking the latter to move the rollers carried thereby into and out of operative position.

With these and other objects in view, the invention consists of the novel features of construction, combination and arrangement of parts hereinafter fully described and claimed, and illustrated in the accompanying drawings, in which—

Figure 1 is a side elevation of a machine constructed in accordance with my invention; Fig. 2 is a top plan view thereof; Fig. 3 is a section taken on the line 3—3 of Fig. 2; Fig. 4 is a detail section taken on the line 4—4 of Fig. 2; and Fig. 5 is a detail perspective view of one end of the crank shaft and the pivoted frame.

Referring more particularly to the drawings 5 indicates the ground wheels mounted upon the ends of an axle 6. A U-shaped frame 7 is arranged upon said axle between the wheels and the ends of said frame are transversely and downwardly disposed as shown at 7' for a purpose which will later appear. The arms of the frame 7 are connected and braced by means of the bar 8 to which one end of the tongue 9 is secured, said tongue extending forwardly above the intermediate portion of said frame. Longitudinal bars 10 also connect the intermediate portion of the frame to the cross bar 8 to hold the same rigidly in position.

Bars 11 are pivoted to the ends of the U-shaped frame and extend beneath the wheel axle forwardly and rearwardly thereof. In the rear ends of these bars the cylinder shaft 12 is mounted on which is secured the tooth cylinder 13. A pair of links 14 are pivoted to each of the bars 11 forwardly of the cylinder 13 and in the lower ends of these links the ends of a second cylinder shaft 15 are rotatably mounted. This shaft carries a second tooth cylinder 16 of smaller diameter than the cylinder 13. One of the links of each pair is formed in two pivotally connected sections as shown at 17, and to one of said sections the end of a link 18 is connected, the other end of which is pivoted to the bar 11. On the links 18, coiled springs 19 are arranged and serve to yieldingly hold the teeth of the cylinder 16 in engagement with the ground.

The cylinders 15 and 16 are formed from a plurality of parallel longitudinal bars 20 rigidly supported on their respective shafts by means of the braces 21. To the bars 20 the teeth 22 are secured. These teeth are conical in form and are reduced at one end to provide the threaded studs 23 which are adapted to be disposed through apertures in the bars and receive the nuts 24 whereby the teeth are secured in position.

The cylinder 13 is positively driven through the medium of the driving chains 24 which pass around the sprockets 25 carried by the ground wheels and the pinions 26 secured on the ends of the cylinder shaft 12. The rear ends of the bars 11 are formed with a plurality of openings 27 to receive the cylinder shaft so that the roller may be readily adjusted in said bars to take up the slack in the driving chains.

In order to prevent undue shock to the cylinder 13 when traveling over rough ground I provide the crank shaft 28 mounted in the U-shaped frame 7 and on the tongue of the machine. To the ends of this crank shaft the members 29 are pivoted at their upper ends. These members are each formed with a cylindrical shank 29' which is movable through an opening in the forward end of the bar 11. Nuts 30 are threaded upon the lower ends of these shanks and coiled springs 31 are disposed on said shanks between the nuts and the bars 11. The bars 11 are adapted to be oscillated upon the ends of the U-shaped frame 7 through the medium of a lever 32 which is connected by a pitman 33 with a crank 28' formed in the crank shaft 28. This lever moves over a rack segment 34 and carries the usual spring pressed dog for engagement with the teeth thereof whereby the lever is held in its adjusted position. It will be obvious from the above description that when the lever is moved rearwardly, the crank shaft will be rotated to elevate the forward ends of the bars 11 and force the teeth of the cylinder 13 into contact with the ground and when the lever is moved forwardly the cylinder 13 will be raised to an inoperative position.

A driver's seat 35 is mounted upon the tongue 9 in position for the driver to readily grasp and manipulate the lever 32.

From the foregoing it will be seen that I have provided a comparatively simple and novel construction in a machine of this character whereby the ground may be thoroughly broken up. The machine is particularly adapted for uprooting what is commonly known as crab grass which grows very close to the ground and is extremely difficult to eradicate from the soil. It will be noted that the teeth on one cylinder pass between those upon the other thus thoroughly covering the entire ground surface over which the machine moves.

While I have described a preferred construction of the rollers 13 and 16, it will be understood that they may be otherwise formed if desired. Many other minor modifications in the form, proportions and details of construction of the various parts may also be resorted to without departing from the essential features or sacrificing any of the advantages of my invention.

Having thus described the invention what is claimed is:—

1. The combination with a wheeled frame, of bars pivoted on said frame intermediate of their ends, tooth carrying cylinders rotatably supported by said bars, means for positively rotating one of said cylinders, means for yieldingly maintaining the teeth of the other cylinder in contact with the ground, and means for oscillating said bars to move the cylinders to operative and inoperative position.

2. The combination with a wheeled frame, of bars pivoted on said frame intermediate of their ends, a toothed cylinder adjustably mounted in the rear ends of said bars, sprockets carried by the wheels, pinions fixed on the cylinder shaft, drive chains traversing said sprockets and pinions, a second toothed cylinder suspended between said pivoted bars, means normally holding the teeth of the latter cylinder yieldingly in contact with the ground, and means mounted in the wheeled frame for oscillating said bars to move said cylinders to operative and inoperative position.

3. The combination with a wheeled frame, of bars pivoted on said frame intermediate of their ends, a toothed cylinder carried by said bars, means for rotating said cylinder, hanger links pivoted to said bars and depending therefrom, a second toothed cylinder rotatably mounted in the lower ends of said links, springs arranged between said bars and links to yieldingly hold the teeth of said cylinder in engagement with the ground, the teeth of one cylinder passing between the teeth on the other cylinder as the cylinders rotate, and means mounted in said frame for moving the cylinders to operative and inoperative position.

4. The combination with driving wheels and an axle connecting the same, of a U-shaped frame supported at its ends on said axle, the ends of said frame extending downwardy below the axle, a bar pivoted to each end of the frame and extending forwardly and rearwardly of the driving wheels, a pair of toothed cylinders rotatably mounted between the rear ends of said bars, means for positively rotating one of said cylinders, independent means for yieldingly supporting said cylinders in operative position, and means for moving said cylinders to operative and inoperative position.

5. The combination with driving wheels and an axle connecting the same, of a U-shaped frame secured at its ends upon said axle, a bar pivoted to each end of said frame and extending rearwardly thereof, spaced toothed cylinders rotatably mounted between the rear ends of said bars, the teeth on one cylinder being adapted to pass between those on the other cylinder, means for positively rotating one of said cylinders, springs arranged at each end of the other cylinder beneath said bars for yieldingly holding the teeth of said cylinder in contact with the ground, and means for simultaneously moving said cylinders to operative and inoperative position.

In testimony whereof I hereunto affix my signature in the presence of two witnesses.

CHARLES F. SCHAUPP.

Witnesses:
JAMES G. ROBERTSON,
B. C. OLSON.